(12) United States Patent
Xu et al.

(10) Patent No.: US 9,479,921 B2
(45) Date of Patent: *Oct. 25, 2016

(54) METHOD AND APPARATUS FOR PERFORMING CLOSED SUBSCRIBER GROUP GROUPING IN WIRELESS COMMUNICATION SYSTEM

(75) Inventors: Jian Xu, Gyeonggi-do (KR); Jin Sook Ryu, Gyeonggi-so (KR); Kyung Min Park, Gyeonggi-do (KR); Young Dae Lee, Gyeonggi-do (KR); Sung Hoon Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 54 days.

This patent is subject to a terminal disclaimer.

(21) Appl. No.: 14/118,950

(22) PCT Filed: Jul. 13, 2012

(86) PCT No.: PCT/KR2012/005628
§ 371 (c)(1),
(2), (4) Date: Jan. 30, 2014

(87) PCT Pub. No.: WO2013/012219
PCT Pub. Date: Jan. 24, 2013

(65) Prior Publication Data
US 2014/0141783 A1    May 22, 2014

Related U.S. Application Data

(60) Provisional application No. 61/509,083, filed on Jul. 18, 2011.

(51) Int. Cl.
*H04W 36/00* (2009.01)
*H04W 4/00* (2009.01)
(Continued)

(52) U.S. Cl.
CPC ............ *H04W 8/186* (2013.01); *H04W 48/16* (2013.01); *H04W 36/08* (2013.01); *H04W 84/045* (2013.01); *H04W 92/12* (2013.01)

(58) Field of Classification Search
CPC .. H04W 8/186; H04W 48/16; H04W 84/045
USPC ......................................................... 455/436
See application file for complete search history.

(56) References Cited

U.S. PATENT DOCUMENTS

2009/0047968 A1* 2/2009 Gunnarsson et al. ........ 455/446
2009/0093232 A1   4/2009 Gupta et al.
(Continued)

FOREIGN PATENT DOCUMENTS

KR    10-2011-0009112 A    1/2011
WO    WO 2010/052843 A1 * 5/2010 ............ H04W 48/14
(Continued)

OTHER PUBLICATIONS

International Search Report issued in corresponding International Patent Application No. PCT/KR2012/005628 dated Jan. 3, 2013.

*Primary Examiner* — Rafael Pérez-Gutiérrez
*Assistant Examiner* — Mark G. Pannell
(74) *Attorney, Agent, or Firm* — Morgan, Lewis & Bockius LLP

(57) ABSTRACT

A method and apparatus for grouping home eNodeBs (HeNBs) in a wireless communication system is provided. The method includes grouping a plurality of HeNBs into at least one closed subscriber group (CSG) group, and transmitting an identifier (ID) of a specific CSG group to HeNBs included in the specific CSG group.

4 Claims, 13 Drawing Sheets

(51) Int. Cl.
  *H04W 8/18* (2009.01)
  *H04W 48/16* (2009.01)
  *H04W 36/08* (2009.01)
  *H04W 92/12* (2009.01)
  *H04W 84/04* (2009.01)

(56) References Cited

U.S. PATENT DOCUMENTS

| | | |
|---|---|---|
| 2009/0238117 A1 | 9/2009 | Somasundaram et al. |
| 2010/0069069 A1* | 3/2010 | Lee et al. ............... 455/435.2 |
| 2010/0075698 A1* | 3/2010 | Rune et al. ............... 455/458 |
| 2010/0210268 A1* | 8/2010 | Lim et al. ............... 455/436 |
| 2011/0165878 A1* | 7/2011 | Nylander et al. ............ 455/436 |
| 2011/0171915 A1* | 7/2011 | Gomes et al. ............... 455/73 |
| 2011/0216732 A1* | 9/2011 | Maeda et al. ............... 370/329 |
| 2011/0269464 A1* | 11/2011 | Xu ............... H04W 36/0033 455/436 |
| 2011/0269465 A1* | 11/2011 | Xu et al. ............... 455/436 |
| 2011/0274086 A1* | 11/2011 | Xu ............... H04L 63/061 370/331 |
| 2012/0069737 A1* | 3/2012 | Vikberg et al. ............ 370/232 |
| 2012/0150998 A1* | 6/2012 | Wang ............... H04W 4/08 709/217 |
| 2012/0258768 A1* | 10/2012 | Takahashi et al. ......... 455/525 |
| 2012/0263147 A1* | 10/2012 | Takahashi et al. ......... 370/331 |
| 2012/0270552 A1* | 10/2012 | Shi et al. ............... 455/438 |

FOREIGN PATENT DOCUMENTS

| | | | |
|---|---|---|---|
| WO | 2011/019085 A1 | 2/2011 | |
| WO | WO 2011/023067 A1 * | 3/2011 | ............ H04W 4/08 |
| WO | WO 2011/046159 A1 * | 4/2011 | ........ H04W 36/0083 |

* cited by examiner

FIG. 3
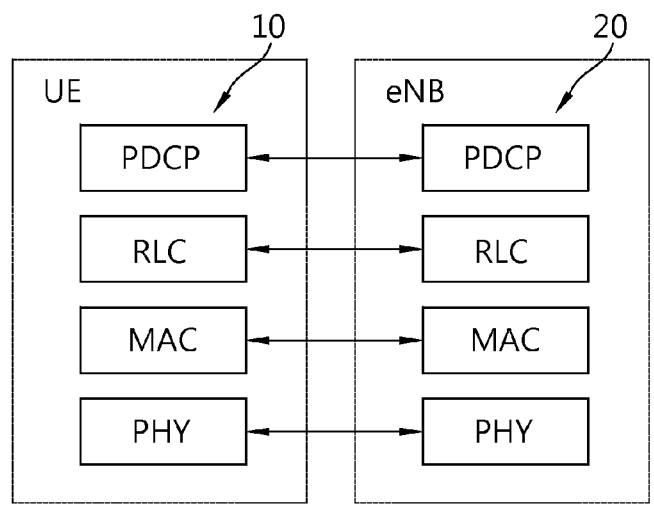
(a)
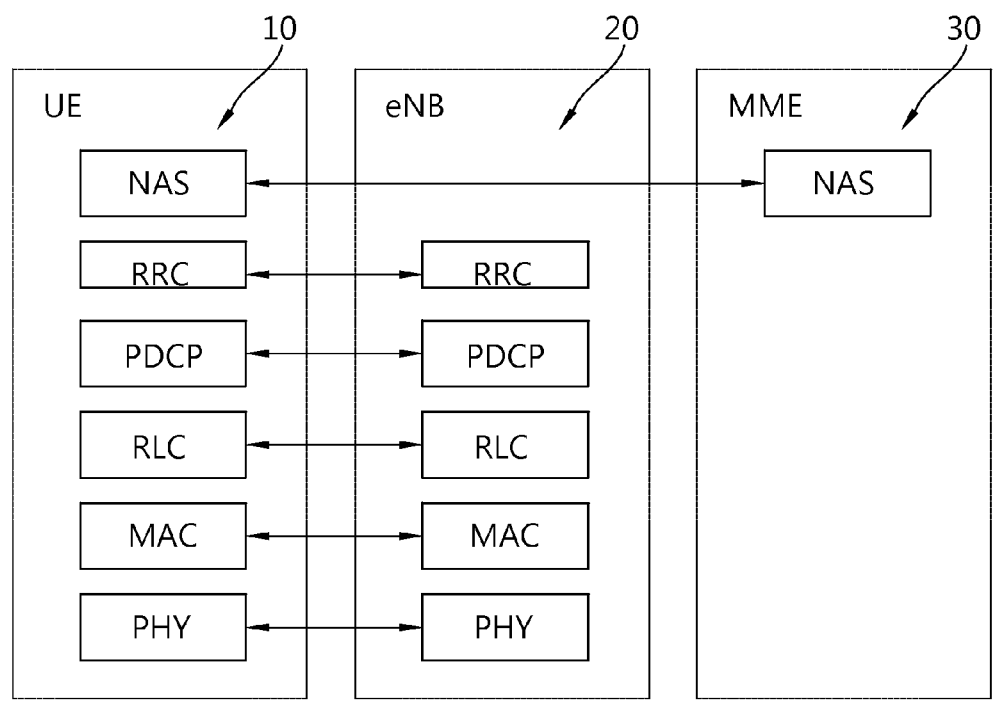
(b)

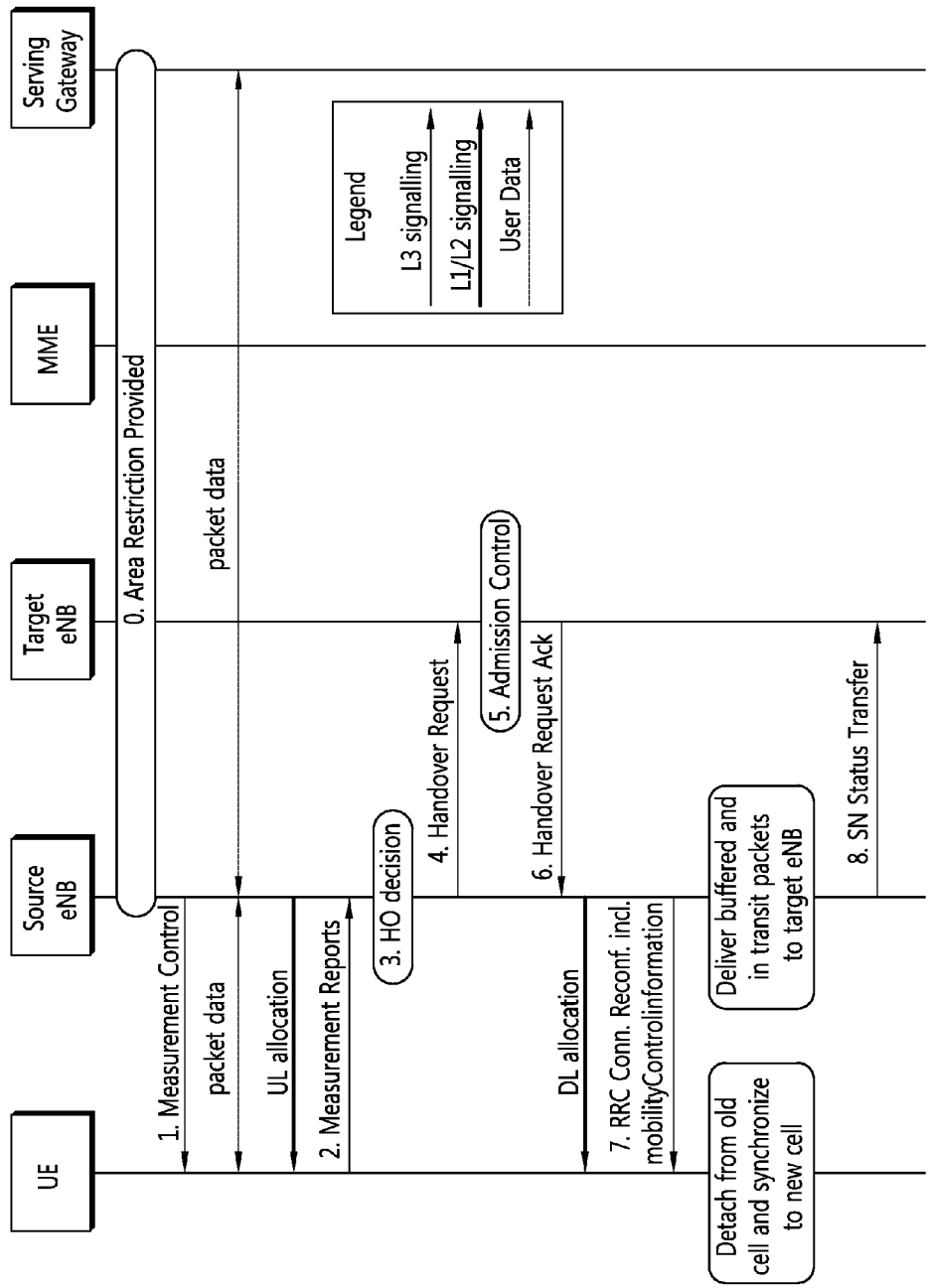

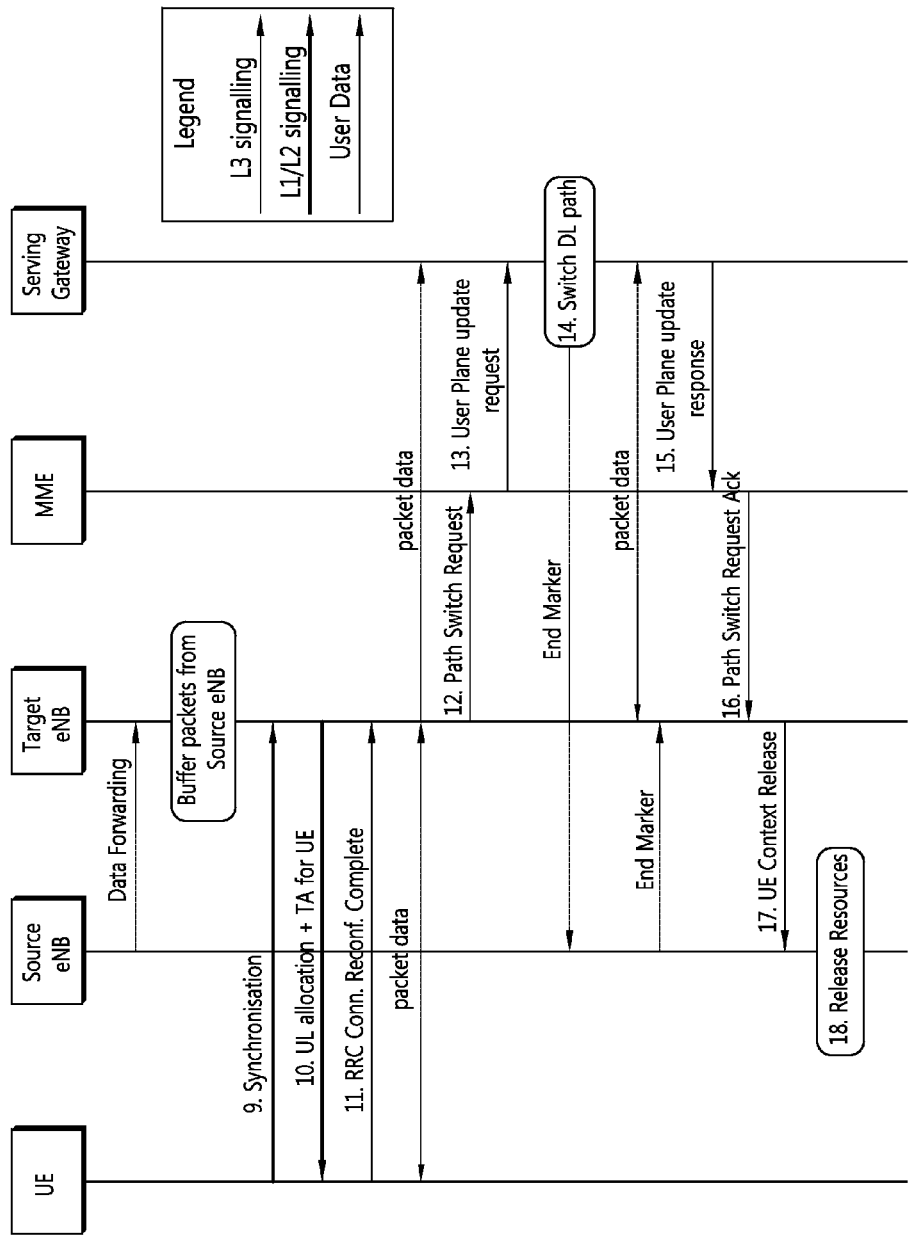

METHOD AND APPARATUS FOR PERFORMING CLOSED SUBSCRIBER GROUP GROUPING IN WIRELESS COMMUNICATION SYSTEM

BACKGROUND OF THE INVENTION

1. Field of the Invention

The present invention relates to wireless communication, and more particularly, to a method and apparatus for performing closed subscriber group (CSG) grouping for home eNodeBs (HeNBs) in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CC CH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, a DTCH that can be mapped to DL-SCH, a MCCH that can be mapped to MCH, and a MTCH that can be mapped to MCH.

The specification of a home eNB (HeNB) is currently ongoing in 3GPP LTE. It may be referred to Paragraph 4.6.1 of 3GPP (3rd generation partnership project) TS 36.300 V10.2.0 (2010 December). The HeNB is a small base station designed for use in residential or small business environment. The HeNB may be a femto cell or a pico cell. The HeNB is short range about tens of meter, installed by the consumer for better indoor voice and data reception.

FIG. 5 shows logical architecture of an E-UTRAN HeNB.

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

A closed subscriber group (CSG) identifies subscribers of an operator who are permitted to access one or more cells but which have restricted access (CSG cells). A CSG cell broadcasts a CSG indicator set to true and a specific CSG identity. A HeNB may be a CSG cell. The CSG cell operates with an open mode or a closed mode. When the CSG cell operates with an open mode, the HeNB operates as a normal eNB. When the CSG cell operates with a closed mode, the HeNB provides services only to its associated CSG members. That is, the HeNB may perform access control which is a process that checks whether a UE is allowed to access and to be granted services in a CSG cell. A CSG whitelist is a list stored in a UE containing the CSG identities of the CSG cells to which the subscriber belongs.

A hybrid cell is a cell broadcasting a CSG indicator set to false and a specific CSG identity. This cell is accessible as a CSG cell by UEs which are members of the CSG cell and as a normal cell by all other UEs. The hybrid cell may check whether a UE is a member or non-member of the hybrid cell. This process may be referred as a membership verification. The UEs which are members of the CSG cell may have a higher priority than other UEs to access to the hybrid cell. The hybrid cell may be referred as a CSG cell which operates with a hybrid mode.

FIG. 6 shows overall architecture with deployed HeNB GW.

It may be referred to Paragraph 4.6.1 of 3GPP (3rd generation partnership project) TS 36.300 V9.3.0 (2010 March). Referring to FIG. 6, an E-UTRAN may include one or more eNB 60, one or more HeNB 70 and a HeNB GW 79. One or more E-UTRAN MME/S-GW 69 may be positioned at the end of the network and connected to an external network. The one or more eNB 60 may be connected to each other through the X2 interface. The one or more eNB 60 may be connected to the MME/S-GW 69 through the S1 interface. The HeNB GW 79 may be connected to the MME/S-GW 69 through the S1 interface. The one or more HeNB 70 may be connected to the HeNB GW 79 through the S1 interface or may be connected to the MME/S-GW 69 through the S1 interface. The one or more HeNB 70 may not be connected to each other.

Based on the structure in FIG. 6, if a user equipment (UE) served currently by an HeNB or an eNB requests handover to another HeNB, the path will go through the core network. That is, the handover should be performed through the S1 interface. This handover procedure can be big signaling impact on the core network, which has to deal with a lot of processing. In addition, a handover delay can be occurred as the handover is performed through the core network, which may be sensitive to UE in a certain situation.

FIG. 7 shows another overall architecture with deployed HeNB GW.

It may be referred to Paragraph 4.6.1 of 3GPP (3rd generation partnership project) TS 36.300 V10.2.0 (2010 December). Referring to FIG. 7, the HeNBs 90 may be connected to each other through the X2 interface. The HeNBs 90 connected to each other through the X2 interface should have same CSG identifiers (IDs) or the target HeNB should operate with the open mode.

That is, only the HeNBs with the same CSG IDs or the target HeNB which operate with the open mode can have the direct X2 interface even if some HeNB may support the hybrid mode, which can be access by any UEs. If the conditions are satisfied, a handover may be performed through the direct X2 interface between HeNBs.

More effective procedure for the HeNB mobility enhancement is required.

SUMMARY OF THE INVENTION

The present invention provides a method and apparatus for performing closed subscriber group CSG) grouping for home eNodeBs (HeNBs) in a wireless communication system. The present invention provides a method of grouping HeNBs into different groups for HeNB mobility enhancement.

In an aspect, a method for grouping home eNodeBs (HeNBs) in a wireless communication system is provided. The method includes grouping a plurality of HeNBs into at least one closed subscriber group (CSG) group, and transmitting an identifier (ID) of a specific CSG group to HeNBs included in the specific CSG group.

The HeNBs included in the specific CSG group may have the same CSG ID.

The HeNBs included in the specific CSG group may have different CSG IDs.

The ID of the specific CSG group may be transmitted by a HeNB gateway (GW).

The HeNBs included in the specific CSG group may be connected to the HeNB GW through a S1 interface.

The specific CSG group may correspond to the HeNB GW.

The ID of the specific CSG group may be transmitted by a mobility management entity (MME).

The plurality of HeNBs may be connected to the MME through a S1 interface.

Each of the at least one CSG group may have different CSG group IDs.

If a user equipment (UE) tries to handover from a first HeNB included in a first CSG group to a second HeNB included in a second CSG group, the method may further include the UE performing a S1 handover procedure.

The method may further include a MME performing an access control or a membership verification.

If a UE tries to handover from a first HeNB included to a second HeNB, the first HeNB and the second HeNB being included in the same CSG group, the method may further include the UE performing a X2 handover procedure.

In another aspect, an apparatus for grouping home eNodeBs (HeNBs) in a wireless communication system is provided. The apparatus includes a radio frequency (RF) unit for transmitting or receiving a radio signal, and a processor, operatively couple to the RF unit, and configured for grouping a plurality of HeNBs into at least one closed subscriber group (CSG) group, and transmitting an identifier (ID) of a specific CSG group to HeNBs included in the specific CSG group.

Effective handover procedure can be performed. The signaling impact to the core network and the S1 handover delay can be reduced.

BRIEF DESCRIPTION OF THE DRAWINGS

FIG. 3 shows a user-plane protocol and a control-plane protocol stack for the E-UMTS.

FIG. 8 shows an example of an intra-MME/S-GW handover procedure.

DESCRIPTION OF EXEMPLARY EMBODIMENTS

Figure 1:
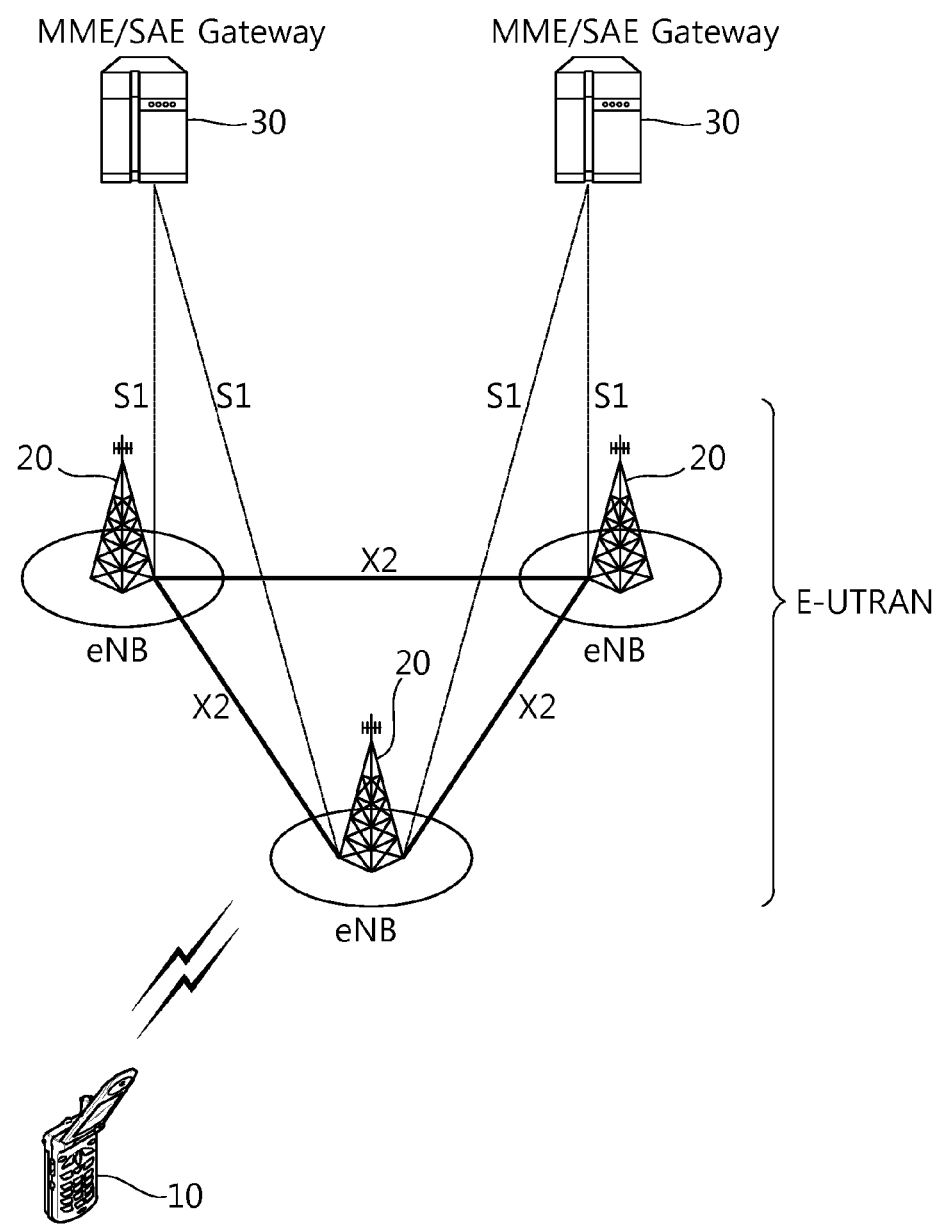
FIG. 1 shows network structure of an evolved universal mobile telecommunication system (E-UMTS).
Figure 2:
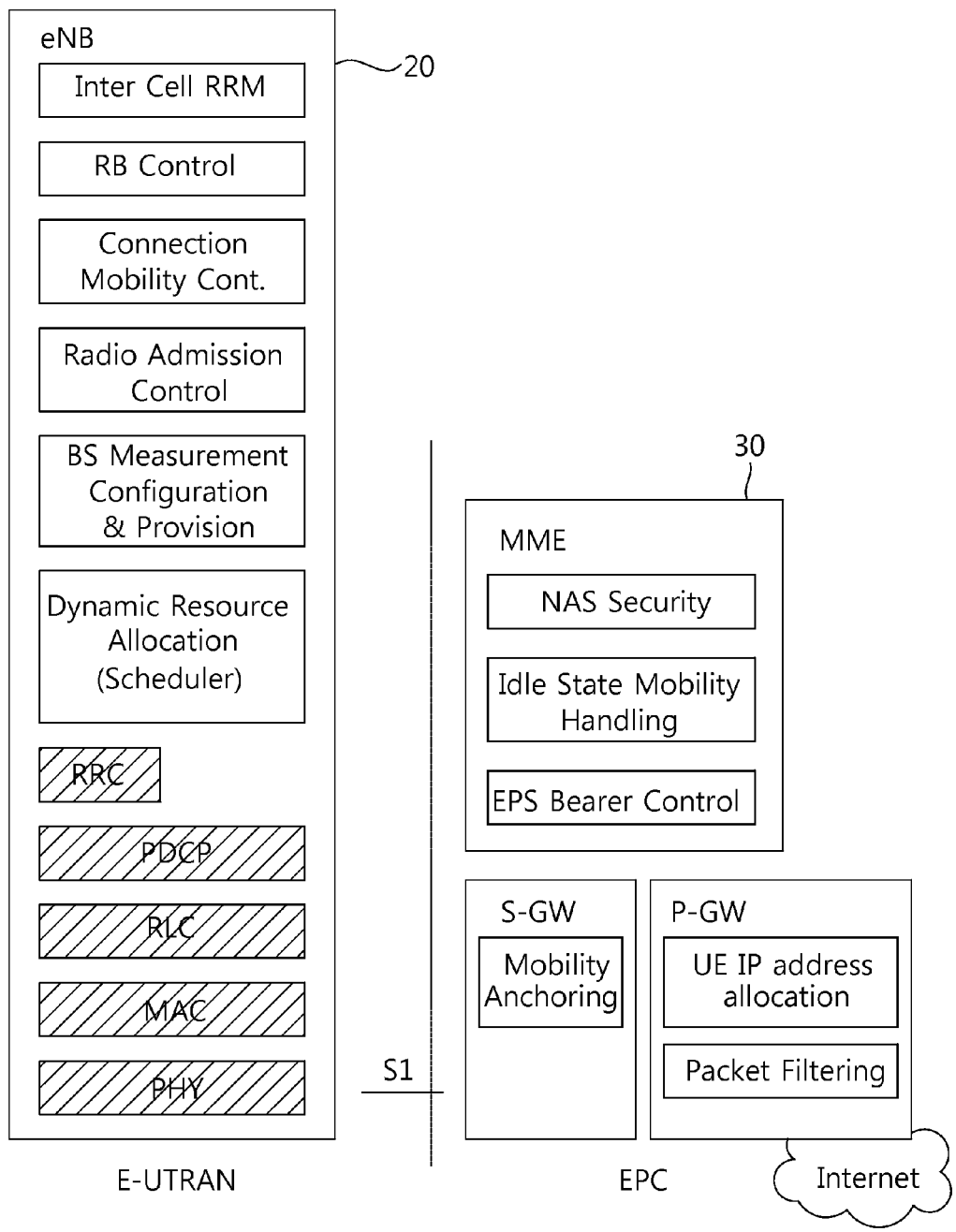
FIG. 2 shows architecture of a typical E-UTRAN and a typical EPC.
Figure 4:
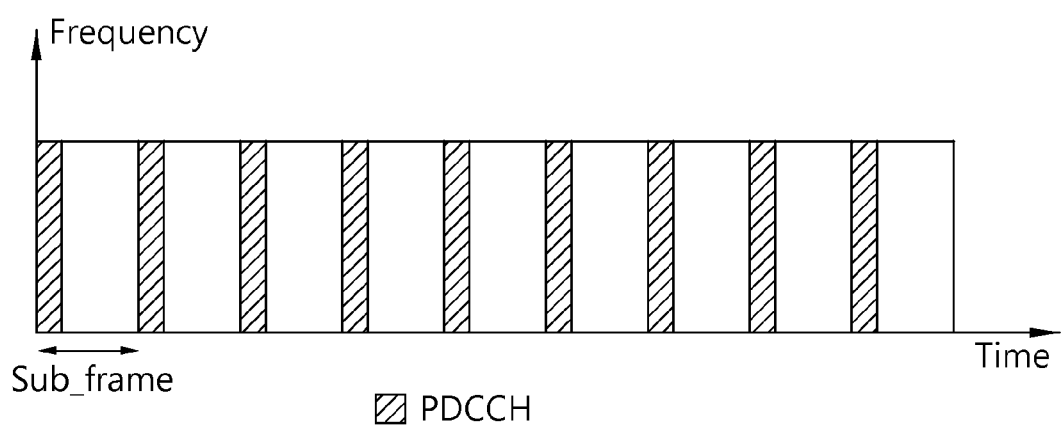
FIG. 4 shows an example of structure of a physical channel.
Figure 5:
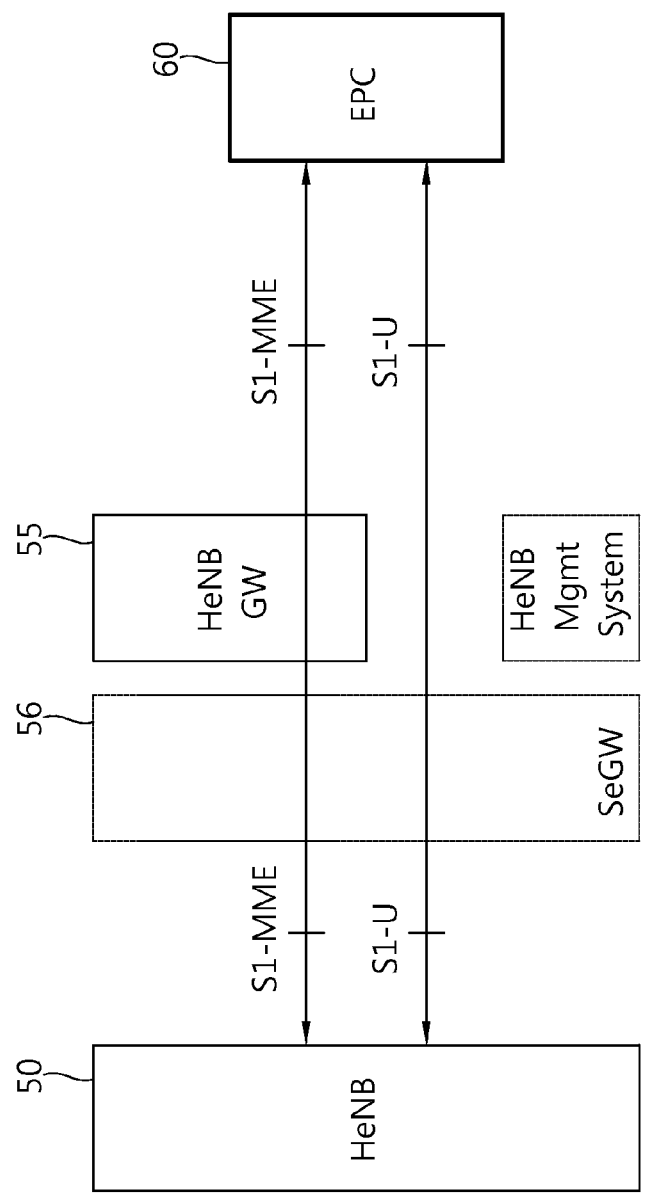
FIG. 5 shows logical architecture of an E-UTRAN HeNB.
Figure 6:
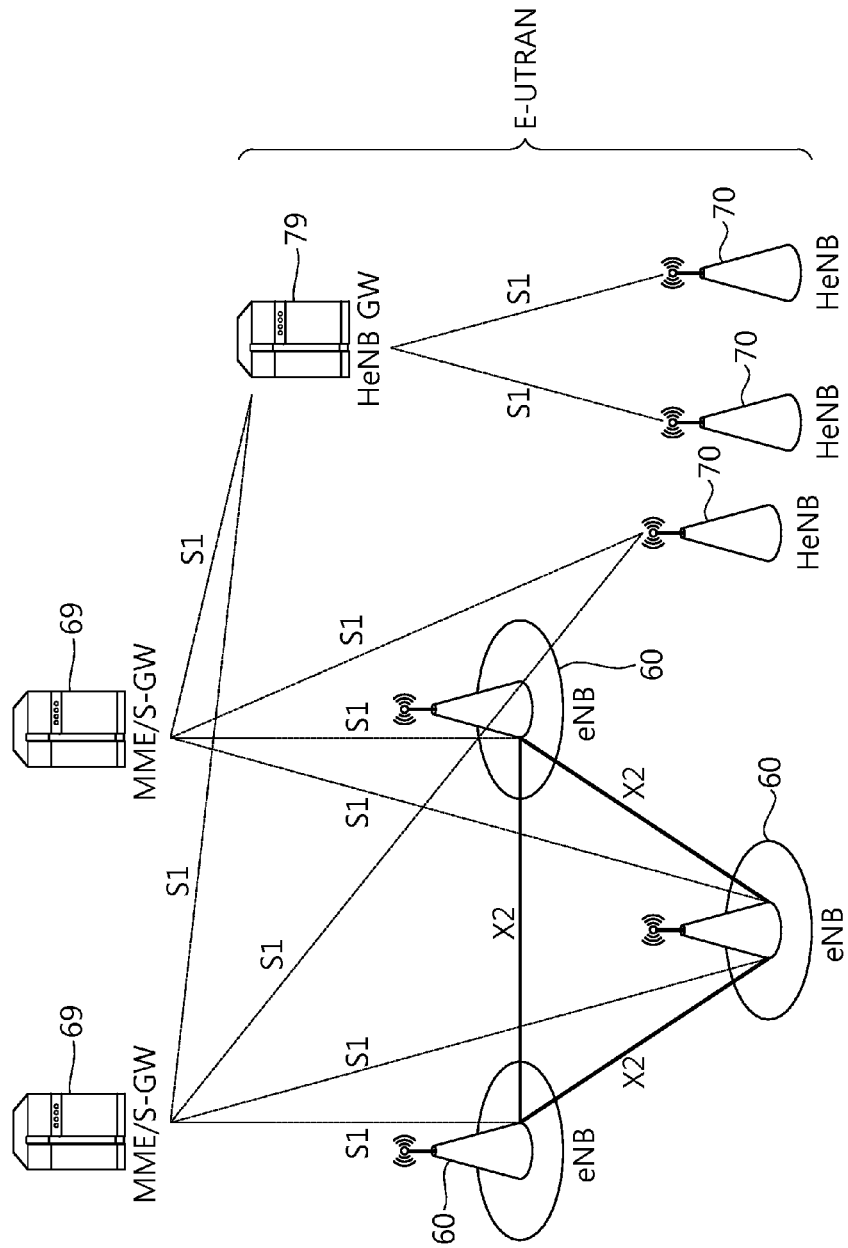
FIG. 6 shows overall architecture with deployed HeNB GW.
Figure 7:
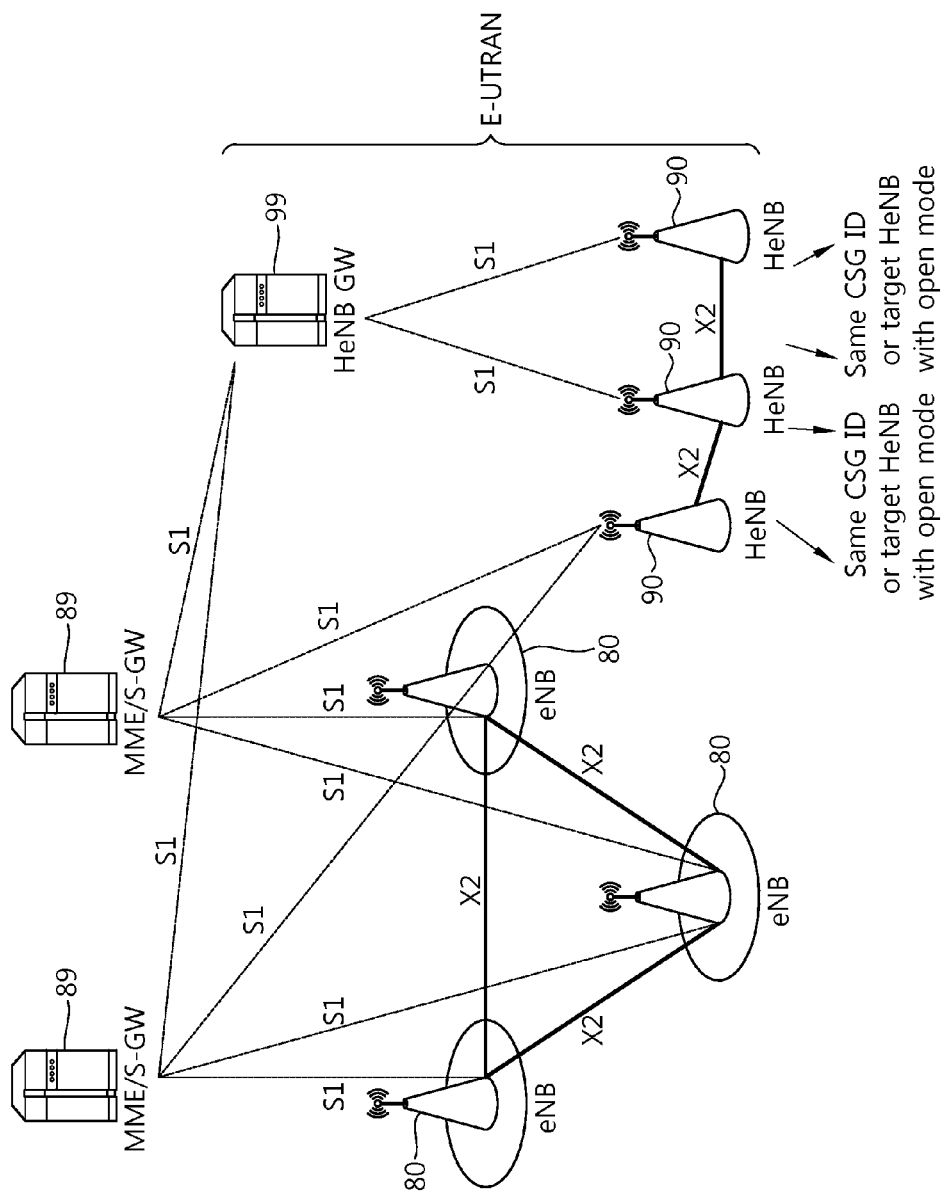
FIG. 7 shows another overall architecture with deployed HeNB GW.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

FIG. 8 shows an example of an intra-MME/S-GW handover procedure.

In E-UTRAN, network-controlled UE-assisted handovers may be performed in RRC_CONNECTED state. Part of the handover command comes from the target eNB and is transparently forwarded to the UE by the source eNB. To prepare the handover procedure, the source eNB passes all necessary information to the target eNB (e.g. E-RAB attributes and RRC context). When a carrier aggregation (CA) is configured and to enable secondary cell (SCell) selection in the target eNB, the source eNB can provide in decreasing order of radio quality a list of the best cells. Both the source eNB and the UE keep some context (e.g. C-RNTI) to enable the return of the UE in case of handover procedure failure. The UE accesses the target cell via a random access channel (RACH) following a contention-free procedure using a dedicated RACH preamble or following a contention-based procedure if dedicated RACH preambles are not available. If the RACH procedure towards the target cell is not successful within a certain time, the UE initiates radio link failure recovery using the best cell.

The preparation and execution phase of the handover procedure is performed without evolved packet core (EPC) involvement. It means that preparation messages are directly exchanged between the eNBs. The release of the resources at the source side during the handover completion phase is triggered by the eNB.

First, the handover preparation procedure is described.

0. Area restriction information is provided. The UE context within the source eNB contains information regarding roaming restrictions which where provided either at connection establishment or at the last timing advance (TA) update.

1. The source eNB configures the UE measurement procedures according to the area restriction information, and transmits a measurement control message to the UE through L3 signaling. Measurements provided by the source eNB may assist the function controlling the UE's connection mobility. Meanwhile, the packet data is exchanged between the UE and the source eNB, or between the source eNB and the serving gateway.

2. The UE transmits measurement reports by the rules set by i.e. system information, specification etc to the source eNB through L3 signaling.

3. The source eNB makes handover decision based on the measurement reports and radio resource management (RRM) information.

4. The source eNB transmits a handover request message through L3 signaling to the target eNB passing necessary information to prepare the handover procedure at the target side. UE X2/UE S1 signaling references enable the target eNB to address the source eNB and the EPC. The evolved radio access bearer (E-RAB) context includes necessary radio network layer (RNL) and transport network layer (TNL) addressing information, and quality of service (QoS) profiles of the E-RABs.

In the case of a UE under an RN performing handover procedure, the handover request message is received by the DeNB, which reads the target cell ID from the message, finds the target eNB corresponding to the target cell ID, and forwards the X2 message toward the target eNB.

In the case of a UE performing handover procedure toward an RN, the handover request is received by the DeNB, which reads the target cell ID from the message, finds the target RN corresponding to the target cell ID, and forwards the X2 message toward the target RN.

5. The target eNB performs admission control. The admission control may be performed dependent on the received E-RAB QoS information to increase the likelihood of a successful handover, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB transmits a handover request acknowledge message to the source eNB through L3 signaling, and prepares the handover. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the source eNB receives the handover request acknowledge message, or as soon as the transmission of the handover command is initiated in the downlink, data forwarding may be initiated.

7. The target eNB transmits an RRC connection reconfiguration message including mobility control information to perform the handover, to be sent by the source eNB to the UE. The source eNB performs the necessary integrity protection and ciphering of the message. The UE receives the RRC connection reconfiguration message with necessary parameters. The UE is commanded by the source eNB to perform the handover procedure. The UE does not need to delay the handover execution for delivering the hybrid automatic repeat request (HARQ)/automatic repeat request (ARQ) responses to the source eNB.

Hereafter, the handover execution procedure will be described.

The UE detaches from old cell and synchronizes to new cell. In addition, the source eNB delivers buffered and in-transit packets to the target eNB.

8. The source eNB transmits a serial number (SN) status transfer message to the target eNB to convey the uplink packet data convergence protocol (PDCP) SN receiver status and the downlink PDCP SN transmitter status of E-RABs for which PDCP status preservation applies. The uplink PDCP SN receiver status may include at least the PDCP SN of the first missing UL SDU and a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRC connection reconfiguration message including the mobility control information, the UE performs synchronization to the target eNB and access the target cell via RACH. The access to the target cell via the RACH may be a contention-free procedure if a dedicated RACH preamble was indicated in the mobility control information. Or, the access to the target cell via RACH may be a contention-based procedure if no dedicated preamble was indicated. The UE derives target eNB specific keys and configures the selected security algorithms to be used in the target cell.

10. The target eNB responds to the synchronization of the UE with UL allocation and timing advance.

11. When the UE has successfully accessed the target cell, the UE transmits an RRC connection reconfiguration complete message (C-RNTI) to confirm the handover procedure, along with an uplink buffer status report, whenever possible, to the target eNB to indicate that the handover procedure is completed for the UE. The target eNB verifies the C-RNTI sent in the RRC connection reconfiguration complete message. The target eNB can now begin transmitting data to the UE. The packet data is exchanged between the UE and the target eNB.

Hereafter, the handover completion procedure will be described.

12. The target eNB transmits a path switch request message to MME to inform that the UE has changed cell.

13. The MME transmits a user plane update request message to a serving gateway (S-GW).

14. The S-GW switches the downlink data path to the target side. The S-GW transmits one or more end marker packets on the old path to the source eNB and then can release any U-plane/TNL resources towards the source eNB.

15. The S-GW transmits a user plane update response message to MME.

16. The MME transmits a path switch acknowledge message to the target eNB to confirm the path switch request message.

17. The target eNB transmits a UE context release message to the source eNB to inform success of the handover procedure and trigger the release of resources by the source eNB.

18. When the UE context release message is received, the source eNB can release radio and C-plane related resources associated to the UE context. Any ongoing data forwarding may continue.

In the legacy S1 handover procedure, an access control or a membership verification may be performed by a MME. By the access control or the membership verification, prioritization of allocated resources may be performed based on the UE's membership status.

The access control may be performed when the target (H)eNB operates with the closed mode. The membership verification may be performed when the target cell is a hybrid cell. The access control or the membership verification is done by a two step process, where first the UE reports the membership status based on the CSG ID received from the target cell and the UE's CSG whitelist, and then the MME verifies the reported status.

However, in the case of X2 handover procedure, if the access control or the membership verification is still performed by the MME before the X2 handover procedure is acknowledged, some problems may be occurred. Firstly the original objective of reducing the signaling overhead of network and reducing the handover delay cannot be realized since the access control or the membership verification is performed by the MME. Secondly, the access control or the membership verification cannot be realized by the X2 interface technically since there is not any message transmitted to the MME before the handover procedure is acknowledged.

Accordingly, to solve the problem described above, a method of grouping the HeNBs according to the present invention can be proposed.

Figure 9:
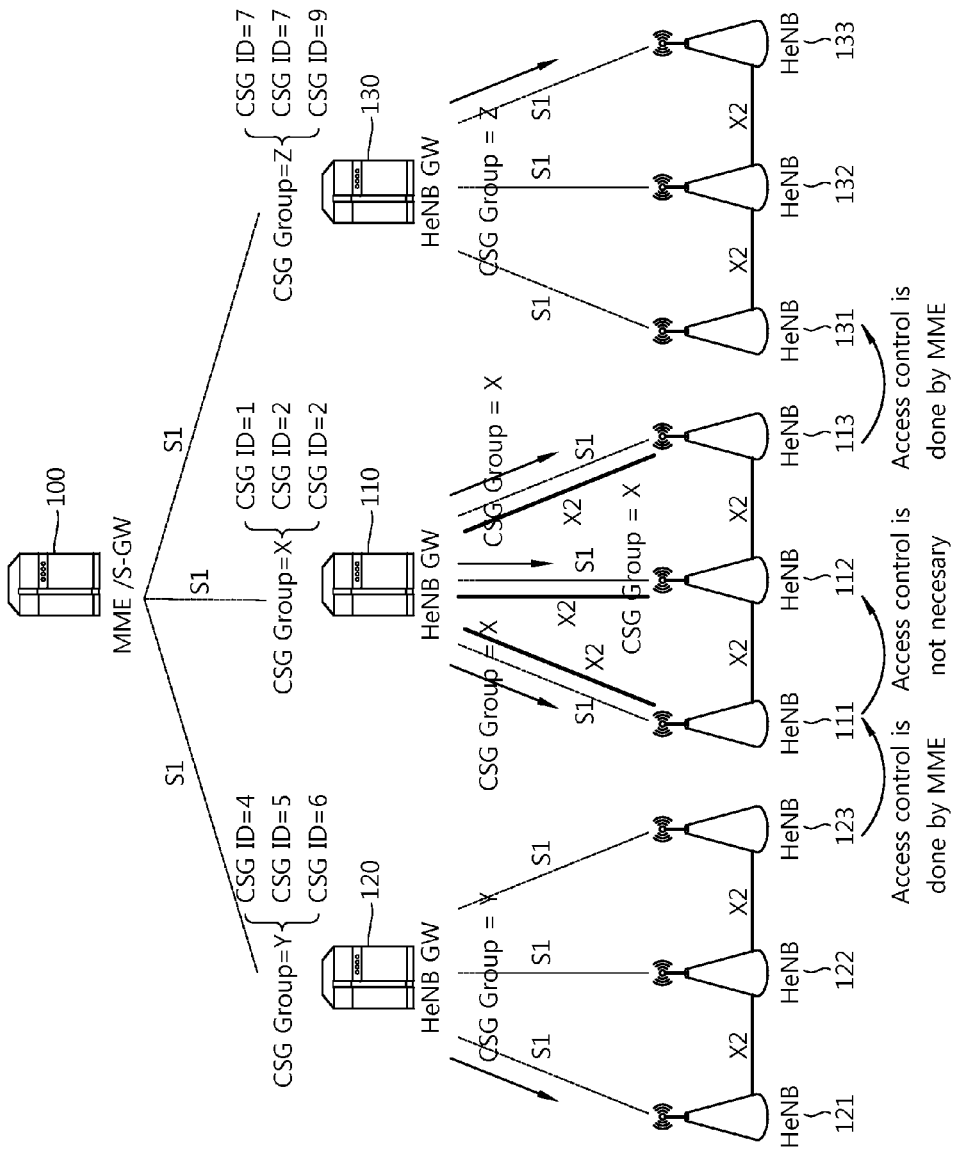
FIG. 9 shows an example of grouping HeNBs according to an embodiment of the present invention.

FIG. 9 shows an example of grouping HeNBs according to an embodiment of the present invention.

FIG. 9 is a case that the HeNB GW exists in the E-UTRAN architecture. The MME/S-GW 100 is connected to HeNB GWs 110, 120 and 130 through the S1 interface.

The MME groups the HeNBs into different groups based on the operator's rule. The HeNBs in one CSG group may have the same CSG ID or different CSG IDs. Each CSG group corresponds to each HeNB GW. Referring to FIG. 9, the HeNBs which has a CSG ID of 1 or 2 are group to CSG group X, which corresponds to the HeNB GW 110. The HeNBs which has a CSG ID of 4 or 5 are group to CSG group Y, which corresponds to the HeNB GW 120. The HeNBs which has a CSG ID of 7 or 9 are group to CSG group Z, which corresponds to the HeNB GW 130. The HeNB GW 110 is connected to HeNBs 111, 112 and 113 through the S1 interface. The HeNB GW 120 is connected to HeNBs 121, 122 and 123 through the S1 interface. The HeNB 130 GW is connected to HeNBs 131, 132 and 133 through the S1 interface. The HeNBs in one CSG group may be connected to each other through the direct X2 interface or the indirect X2 interface.

The HeNB GW transmits an identifier (ID) of the CSG group (CSG group ID) corresponding to the HeNB GW to its individual HeNB in that CSG group. Or, the HeNB GW may just transmit the CSG ID of each individual HeNB in that CSG group to each HeNB. In this way, the CSG group ID may not be transmitted. Also, during the X2 setup procedure or the X2 eNB configuration update procedure between the HeNBs in one CSG group, the HeNB notifies or updates the CSG group ID to each other.

For the inter-group handover, which means that the handover procedure is performed between different CSG groups, the S1 handover procedure may be performed. Thus the general legacy handover procedure can be adopted. Accordingly, the access control or the membership verification is necessary and is performed by the MME. The membership status of the UE is verified by the MME. Referring to FIG. 9, if the UE tries to perform handover procedure from the HeNB 123 to the HeNB 111 or from the HeNB 113 to the HeNB 131, the S1 handover procedure is performed and the access control or the membership verification is performed by the MME.

For the intra-group handover, which means that the handover procedure is performed in one CSG group, the X2 handover procedure may be performed. In this case, the HeNB knows the CSG group ID of that of the neighbour HeNBs in the same CSG group. Since the access control or the membership verification has been already performed by the MME when the UE moves towards this CSG group, the additional access control or the membership verification is not necessary. Referring to FIG. 9, if the UE tries to perform handover procedure from the HeNB 111 to the HeNB 112, the X2 handover procedure is performed and the access control or the membership verification is not required.

Figure 10:
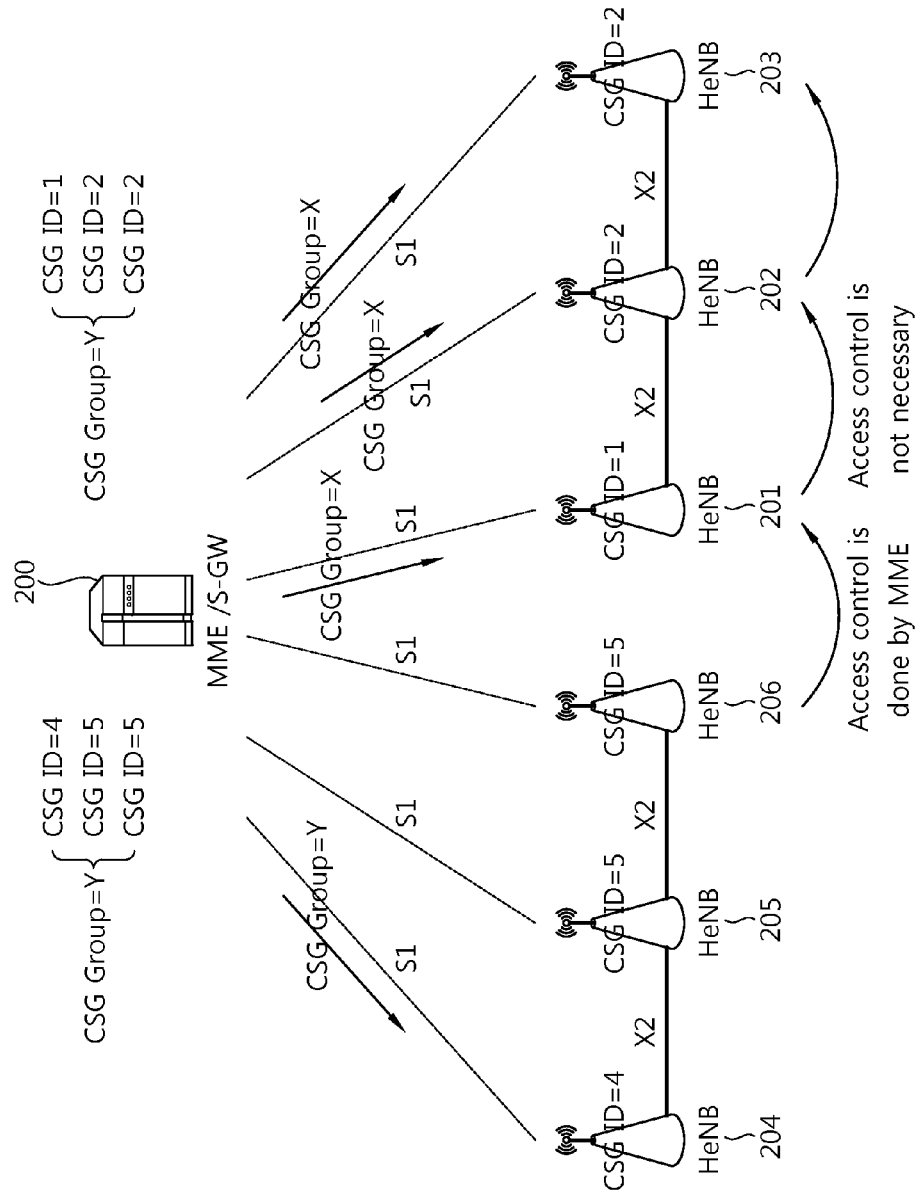
FIG. 10 shows an example of grouping HeNBs according to an embodiment of the present invention.

FIG. 10 shows an example of grouping HeNBs according to an embodiment of the present invention.

FIG. 10 is a case that the MME is connected to HeNBs directly through the S1 interface. The MME/S-GW 200 is connected to HeNB 201, 202, 203 204, 205 and 206 through the S1 interface.

The MME groups the HeNBs into different groups based on the operator's rule. The HeNBs in one CSG group may have the same CSG ID or different CSG IDs. Referring to FIG. 10, the HeNBs which has a CSG ID of 1 or 2 are group to CSG group X. The HeNBs which has a CSG ID of 4 or 5 are group to CSG group Y. The HeNBs in one CSG group may be connected to each other through the direct X2 interface or the indirect X2 interface.

The MME transmits a CSG group ID to individual HeNB in the specific CSG group. Or, the MME GW may just transmit the CSG ID of each individual HeNB in that CSG group to each HeNB. In this way, the CSG group ID may not be transmitted. Also, during the X2 setup procedure or the X2 eNB configuration update procedure between the HeNBs in one CSG group, the HeNB notifies or updates the CSG group ID to each other.

For the inter-group handover, which means that the handover procedure is performed between different CSG groups, the S1 handover procedure may be performed. Thus the general legacy handover procedure can be adopted. Accordingly, the access control or the membership verification is necessary and is performed by the MME. The membership status of the UE is verified by the MME. Referring to FIG. 10, if the UE tries to perform handover procedure from the HeNB 206 to the HeNB 201, the S1 handover procedure is performed and the access control or the membership verification is performed by the MME.

For the intra-group handover, which means that the handover procedure is performed in one CSG group, the X2 handover procedure may be performed. In this case, the HeNB knows the CSG group ID of that of the neighbour HeNBs in the same CSG group. Since the access control or the membership verification has been already performed by the MME when the UE moves towards this CSG group, the additional access control or the membership verification is not necessary. Referring to FIG. 10, if the UE tries to perform handover procedure from the HeNB 201 to the HeNB 202, the X2 handover procedure is performed and the access control or the membership verification is not required.

Figure 11:
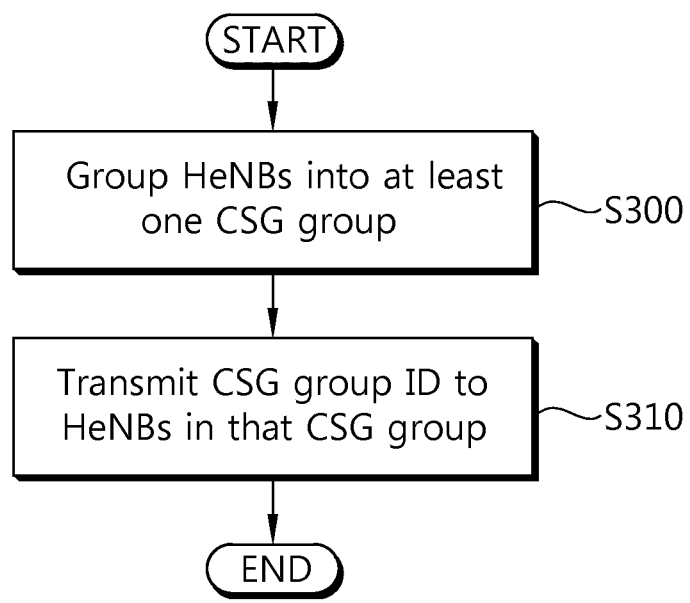
FIG. 11 shows an example of the proposed method of performing CSG grouping according to an embodiment of the present invention.

FIG. 11 shows an example of the proposed method of performing CSG grouping according to an embodiment of the present invention.

In step S300, the MME groups a plurality of HeNBs into at least one CSG group. In step S310, the MME or the HeNB GW transmits a CSG group ID of a specific CSG group to HeNBs included in the specific CSG group. For the inter-group handover, the S1 handover procedure is performed, and the access control or the membership verification is performed by the MME. For the intra-group handover, the X2 handover procedure is performed, and the access control or the membership verification is not necessary.

Figure 12:
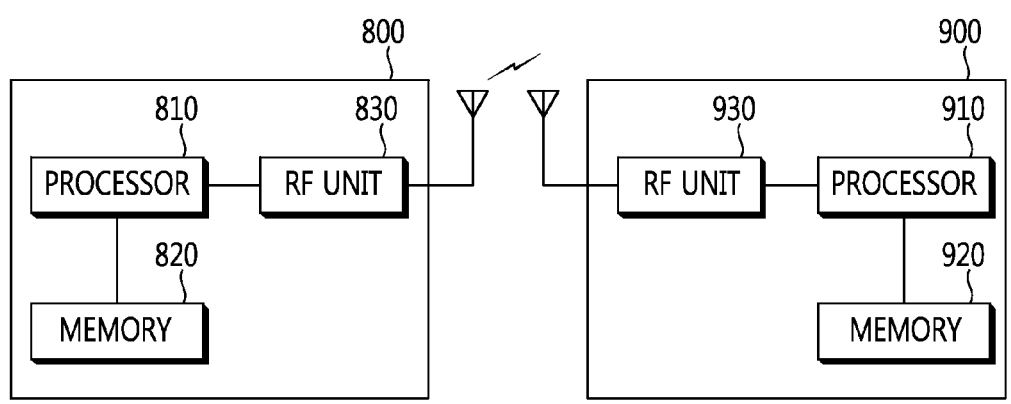
FIG. 12 is a block diagram showing wireless communication system to implement an embodiment of the present invention.

FIG. 12 is a block diagram showing wireless communication system to implement an embodiment of the present invention.

A HeNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A MME 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for grouping home eNodeBs (HeNBs) in a wireless communication system, the method comprising:
grouping, by a mobility management entity (MME), a plurality of HeNBs into at least one closed subscriber group (CSG) group,
wherein the at least one CSG group includes the plurality of HeNBs having one or more closed subscriber group (CSG) identifiers (IDs) assigned to the plurality of HeNBs,
wherein, when there is more than one of the one or more CSG IDs, the one or more CSG IDs are different from each other; and
transmitting, by the MME, the one or more CSG IDs to the plurality of HeNBs included in the at least one CSG group via a HeNB gateway connected with the MME through a direct S1 interface,
wherein each of the plurality of the HeNBs is connected with the HeNB gateway via the direct S1 interface,
wherein, when an intra-group handover is performed within the at least one CSG group, an X2 handover procedure is operated without performing an access control by the MME, and
wherein the X2 handover procedure is performed if:
the one or more CSG IDs are different to each other, and
the one or more CSG IDs are included in same CSG group.

2. The method of claim 1, wherein the at least one HeNB included in the CSG group is further configured to check a CSG group ID of another HeNB, when the at least one HeNB configures an X2 setup with the another HeNB or updates an X2 eNB configuration with the another HeNB.

3. An apparatus for grouping home eNodeBs (HeNBs) in a wireless communication system, the apparatus comprising:
a communication unit configured to transmit or receive a signal; and
a processor, operatively coupled to the communication unit, and configured to:
group a plurality of HeNBs into a closed subscriber group (CSG) group,
wherein the at least one CSG group includes the plurality of HeNBs having one or more closed subscriber group (CSG) identifiers (IDs) assigned to the plurality of HeNBs,
wherein, when there is more than one of the one or more CSG IDs, the one or more CSG IDs are different from each other,
wherein a CSG group identifier (ID) is assigned to the at least one CSG group for identifying the at least one CSG group among a plurality of different CSG groups; and
transmit the one or more CSG IDs to the plurality of HeNBs included in the at least one CSG group via a HeNB gateway connected with a mobility management entity (MME) through a direct S1 interface,
wherein each of the plurality of the HeNBs is connected with the HeNB gateway via the direct S1 interface,
wherein, when an intra-group handover is performed within the at least one CSG group, an X2 handover procedure is operated without performing an access control by the MME, and
wherein the X2 handover procedure is performed if:
the one or more CSG IDs are different to each other, and
the one or more CSG IDs are included in the at least one CSG group.

4. The apparatus of claim 3, wherein the at least one HeNB included in the CSG group is further configured to check a CSG group ID of another HeNB, when the at least one HeNB configures an X2 setup with the another HeNB or updates an X2 eNB configuration with the another HeNB.

* * * * *